(12) United States Patent
Eguchi et al.

(10) Patent No.: US 6,709,364 B2
(45) Date of Patent: Mar. 23, 2004

(54) VEHICULAR POWER-TRANSMISSION CONTROL SYSTEM

(75) Inventors: Takahiro Eguchi, Wako (JP); Masaaki Yamaguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/303,209

(22) Filed: Nov. 25, 2002

(65) Prior Publication Data

US 2003/0109359 A1 Jun. 12, 2003

(30) Foreign Application Priority Data

Dec. 10, 2001 (JP) .......................... 2001-375645

(51) Int. Cl.$^7$ .............................................. B60K 41/02
(52) U.S. Cl. ..................... 477/174; 477/166; 477/180; 477/5; 477/39; 477/83
(58) Field of Search ........................ 477/3, 5, 39, 47, 477/83, 174, 166, 173, 176, 180

(56) References Cited

U.S. PATENT DOCUMENTS 5,562,571 A * 10/1996 Maruyama et al. ......... 477/174
5,626,535 A * 5/1997 Kono et al. ................. 477/174
5,655,996 A * 8/1997 Ohtsuka ..................... 477/166
5,667,458 A * 9/1997 Narita et al. ................ 477/169
5,807,209 A * 9/1998 Matsubara et al. ......... 477/176
5,816,979 A * 10/1998 Shiiba et al. ................ 477/176
6,379,278 B1 * 4/2002 Eguchi et al. ................ 477/39

FOREIGN PATENT DOCUMENTS

| JP | 58197458 | * 11/1983 | .......... F02M/17/38 |
| JP | 404039131 | * 2/1992 | .......... B60K/41/02 |

* cited by examiner

*Primary Examiner*—Charles A. Marmor
*Assistant Examiner*—Eric M. Williams
(74) *Attorney, Agent, or Firm*—Fish & Richardson P.C.

(57) ABSTRACT

A rotational driving force from an engine E in a fuel-supply termination control is transmitted through a continuously variable transmission CVT, and this transmission of the rotational driving force is controlled by the engagement of a starting clutch 5. In this arrangement, a control system terminates the fuel supply to the engine at the elapse of a predetermined time from the starting of a deceleration of the vehicle. When the control system detects that the throttle of the engine has closed, it reduces the engaging force of the starting clutch 5 to disengage the clutch into a pre-engagement condition. Thereafter, when the fuel supply to the engine is terminated, the engaging force is gradually increased to bring the starting clutch 5 gradually into engagement.

7 Claims, 6 Drawing Sheets

VEHICULAR POWER-TRANSMISSION CONTROL SYSTEM

FIELD OF THE INVENTION

The present invention relates to a power transmission control system used for a vehicle whose engine is controlled to allow termination of fuel supply and whose driving force is transmitted through a power-transmission mechanism to drive wheels by a transmission control being executed with a frictionally engaging element (for example, friction clutch).

BACKGROUND OF THE INVENTION

Generally, an automobile includes a construction for transmitting the driving force of an engine to drive wheels through a power-transmission mechanism for driving a vehicle body. Additionally, for the purpose of improving fuel economy, a vehicle, nowadays, is equipped with a fuel-supply termination control (fuel cut-off control), in which the supply of fuel to the engine is stopped when the vehicle is in a deceleration with the throttle being closed (i.e., the accelerator pedal being released). However, it is known that if the fuel supply is terminated at the same time as the throttle is closed, then an abrupt engine brake may be generated to create a negative torque on the drive wheel side, resulting in a deceleration shock. To solve this problem, before the supply of fuel is terminated (for example, when the throttle is determined to have closed), the power-transmission clutch (frictionally engaging element) that is in operation establishing a power transmission path in the power-transmission mechanism currently is disengaged, or the lock-up clutch (frictionally engaging element) of the torque convertor is released to reduce the deceleration shock. In this case, the frictionally engaging element such as the power-transmission clutch or the lock-up clutch, having been disengaged, is engaged gradually again after the elapse of a predetermined time while the fuel cut-off is continued, achieving an improvement in both fuel economy and drive performance.

However, a vehicle in this fuel-supply termination control has a weakness. While the vehicle is traveling at a low speed, if the accelerator pedal is operated to return slightly, then this action may be taken as a closing of the throttle in this control, resulting in a termination of the fuel supply. This misjudgment in the control can happen because the opening of the throttle is small while the vehicle is traveling slowly. If such a misjudgment happen, this will result in a deceleration that can be against the driver's will. To prevent such a situation from occurring, a predetermined delay is provided between the time points when the throttle is determined to have closed and when the fuel supply is terminated. This delay is variably adjusted in correspondence to the condition of the vehicle in traveling.

In this case, where the delay before the termination of the fuel supply is adjusted variably, it is difficult to determine an appropriate time at which the frictionally engaging element (power-transmission clutch or lock-up clutch), having been disengaged, should be engaged again, because a conventional practice has been that the time for the clutch to re-engage (or the time period during which the clutch is disengaged) is set at a predetermined time on a timer. If the time period for disengaging the clutch is too short, then the timing of the termination of the fuel supply and that of the re-engagement of the clutch are too close to each other, so the result will be a deceleration shock. Conversely, if the time period during which the clutch is disengaged is relatively long, then the rotational speed of the engine will decrease rapidly to a level at which the termination of the fuel supply is not allowed, or even if the fuel supply is terminated, it will be started again in a short time. In this situation, it is difficult to improve the fuel efficiency of the vehicle.

This problem is more serious in a hybrid-type power transmission, which incorporates an electrical motor generator provided in parallel with the engine to recover energy by exploiting the rotational drive of the drive wheels during the deceleration of the vehicle (by generating electricity with the electrical motor generator and charging the battery). This is because, during the deceleration of the vehicle, the torque driving the electrical motor generator acts to further decelerate the vehicle.

In this type of power transmission, which recovers energy by the electrical motor generator driven from the deceleration of the vehicle, generally, if the brake is activated to restrict the rotation of the wheels during the deceleration, the torque driving the electrical motor generator (referred to as "recovery torque") is increased to increase the rate of energy recovery by the electrical motor generator. This recovery torque increases the rate of energy being recovered and, at the same time, assists the braking of the drive wheels to unburden the braking system. In this control, for example, in a case where the brake pedal is stepped down simultaneously while the accelerator pedal is released to close the throttle, if the clutch is released at the same time as the throttle is closed, then a large deceleration torque (negative torque) can act on the clutch, increasing the clutch slip ratio. As a result, the rotational speed of the engine decreases rapidly, this condition preventing the termination of the fuel supply. In such a case, even if the fuel supply is terminated, the fuel supply is restarted in a short time. After all, there is no gain in fuel economy. Furthermore, if the clutch slip ratio increases rapidly, then the clutch is controlled to engage quickly to decrease the clutch slip ratio. This may result in a shock and impair the driving performance of the vehicle.

Another problem is that if the rotational speed of the engine decreases rapidly during a deceleration, then it can happen that the recovery torque be controlled to increase, resulting in a vicious spiral of the rotational speed being further decreased. This can happen because a vehicle with a hybrid-type power transmission is often equipped with a recovery control that sets the rate of energy recovery to a predetermined power (KW) for the purpose of stabilizing the deceleration.

SUMMARY OF THE INVENTION

It is an object of the present invention to provide a power-transmission control system for a vehicle, which system improves fuel economy by controlling the termination of the fuel supply while the vehicle is in a deceleration with the throttle being closed.

It is another object of the present invention to provide a power-transmission control system for a vehicle, which system controls the clutch to engage smoothly without a shock while the vehicle is in a deceleration with the throttle being closed.

To achieve this objective, the present invention provides a vehicular power-transmission control system that comprises an engine, a power-transmission mechanism (for example, the continuously variable transmission CVT described in the following embodiment) and a frictionally engaging element (for example, the starting clutch 5, the forward clutch 25 and the reverse brake 27 described in the following embodiment). The engine can be operated under a fuel-supply termination control, and the power-transmission mechanism transmits a rotational driving force from the engine to wheels. The frictionally engaging element controls the transmission of the rotational driving force in the power-transmission mechanism. When the throttle of the engine is closed to decelerate the vehicle in traveling, this control system executes a vehicle-in-deceleration control by terminating the fuel supply to the engine at the time when a predetermined time has elapsed since the starting of the deceleration. In the vehicle-in-deceleration control, when the throttle is detected to have closed, the engaging force of the frictionally engaging element is set to reduce the torque being transmitted through the frictionally engaging element. However, after the termination of the fuel supply to the engine, the engaging force is gradually increased to bring the frictionally engaging element gradually into engagement.

According to this vehicular power-transmission control system, when the throttle of the engine is closed to decelerate the vehicle in traveling, the control system at first detects the closing of the throttle and releases the frictionally engaging element into a pre-engagement condition. As a result, there is no possibility for the drive wheels to receive an abrupt engine brake, so the possibility of deceleration shock is eliminated completely. Thereafter, the control system waits for a predetermined time to elapse and then terminates the fuel supply to the engine for improving fuel economy. After the termination of the fuel supply, the control system increases the engaging force of the frictionally engaging element gradually. This action securely prevents both a rapid decrease in the rotational speed of the engine and a shock that may otherwise occur by an action of a large decelerating force, which is generated in relation to the termination of the fuel supply. According to the present invention, once the fuel supply is terminated, unlike a prior-art control system, there is no chance for the fuel supply to be restarted in a short time by a rapid decrease in the rotational speed of the engine. Therefore, the fuel-supply termination control is executed in a desirable way to improve the fuel economy of the vehicle.

In the vehicle-in-deceleration control, if the frictionally engaging element slips to the decelerating side, it is preferable that the engaging force of the frictionally engaging element be controlled to increase gradually and to restrict the slip ratio within a range smaller than a predetermined value. This action securely prevents a rapid decrease in the rotational speed of the engine. Therefore, unlike a prior-art control system, the control system according to the present invention gives no chance for the rotational speed of the engine to decrease rapidly triggering a restarting of the fuel supply in a short time after the termination of the fuel supply. This condition enables the fuel-supply termination control to be executed in a desirable way to improve the fuel economy of the vehicle.

Furthermore, the control system may comprise an electrical motor generator, which is provided at a position on the side of the engine from the frictionally engaging element. In this case, the electrical motor generator can drive the drive wheels through the power-transmission mechanism, and it can also recover energy by receiving a driving force from the drive wheels through the power-transmission mechanism. In the vehicle-in-deceleration control, the control system preferably sets the electrical motor generator to receive the driving force of the drive wheels through the power-transmission mechanism and to recover energy in correspondence to the engagement condition of the frictionally engaging element. In this case, while the energy recovery is going on, if the rotational speed of the engine become equal to or lower than a predetermined rotational speed, then preferably, the energy recovery rate is controlled to become lower.

If a system is arranged with an electrical motor generator to perform energy recovery as described above, customary, the rate of energy recovery is set to a predetermined power (KW) for the purpose of stabilizing the deceleration. The control system according to the present invention reduces the energy recovery rate if the rotational speed of the engine is lower than a predetermined rotational speed as described above. By controlling in this way, the control system prevents the rotational speed of the engine from decreasing. For example, when the brake is operated to restrict the rotation of the wheels during a deceleration of the vehicle, although the energy recovery rate of the electrical motor generator is controlled to increase, if the rotational speed of the engine decreases rapidly, then the energy recovery rate is controlled to decrease so that the rotational speed will not become equal to or lower than the predetermined rotational speed. In this way, a rapid decrease is avoided in the rotational speed of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
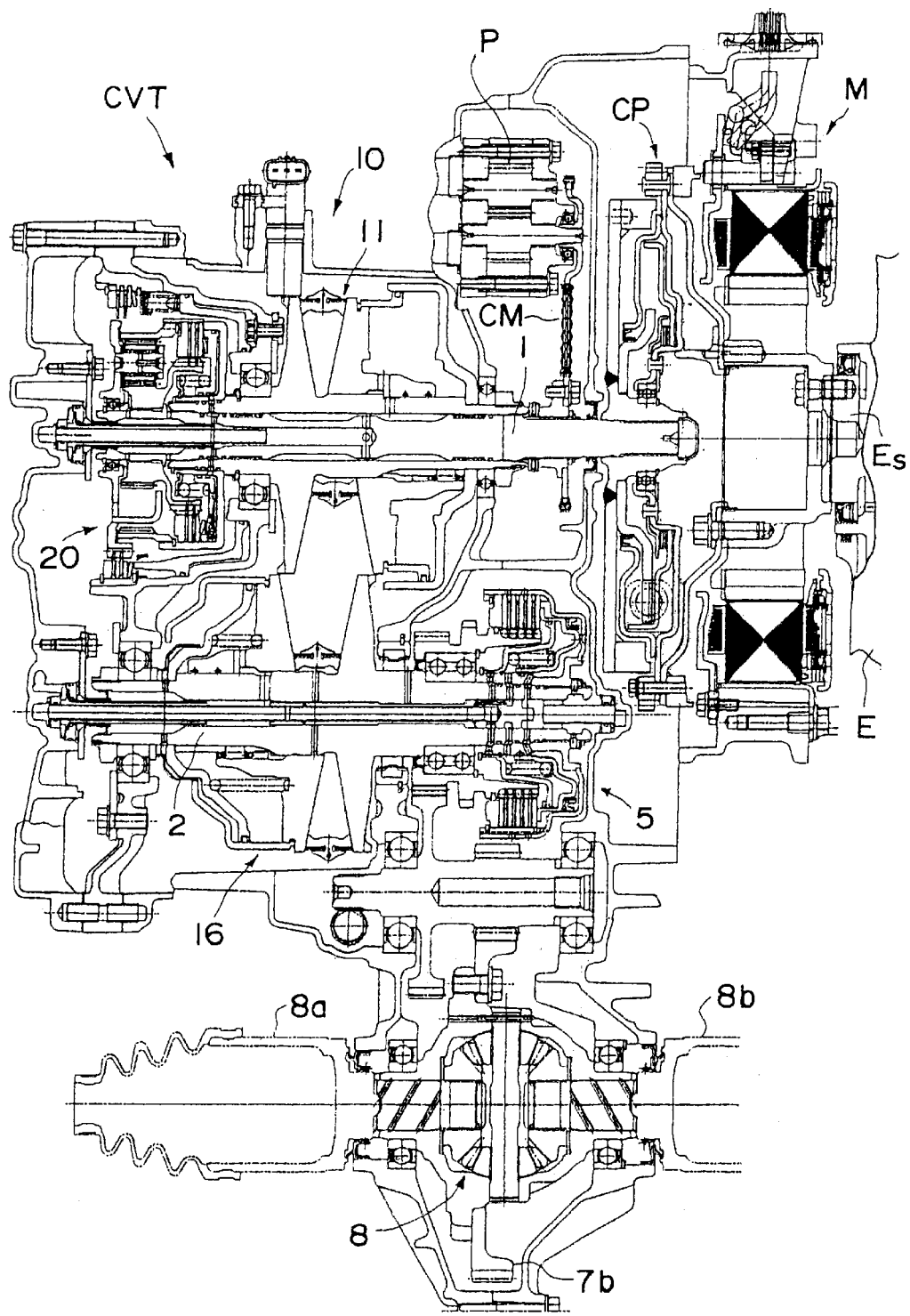
FIG. 1 is a sectional view describing the construction of a power transmission, which is controlled by a control system according to the present invention.
Figure 2:
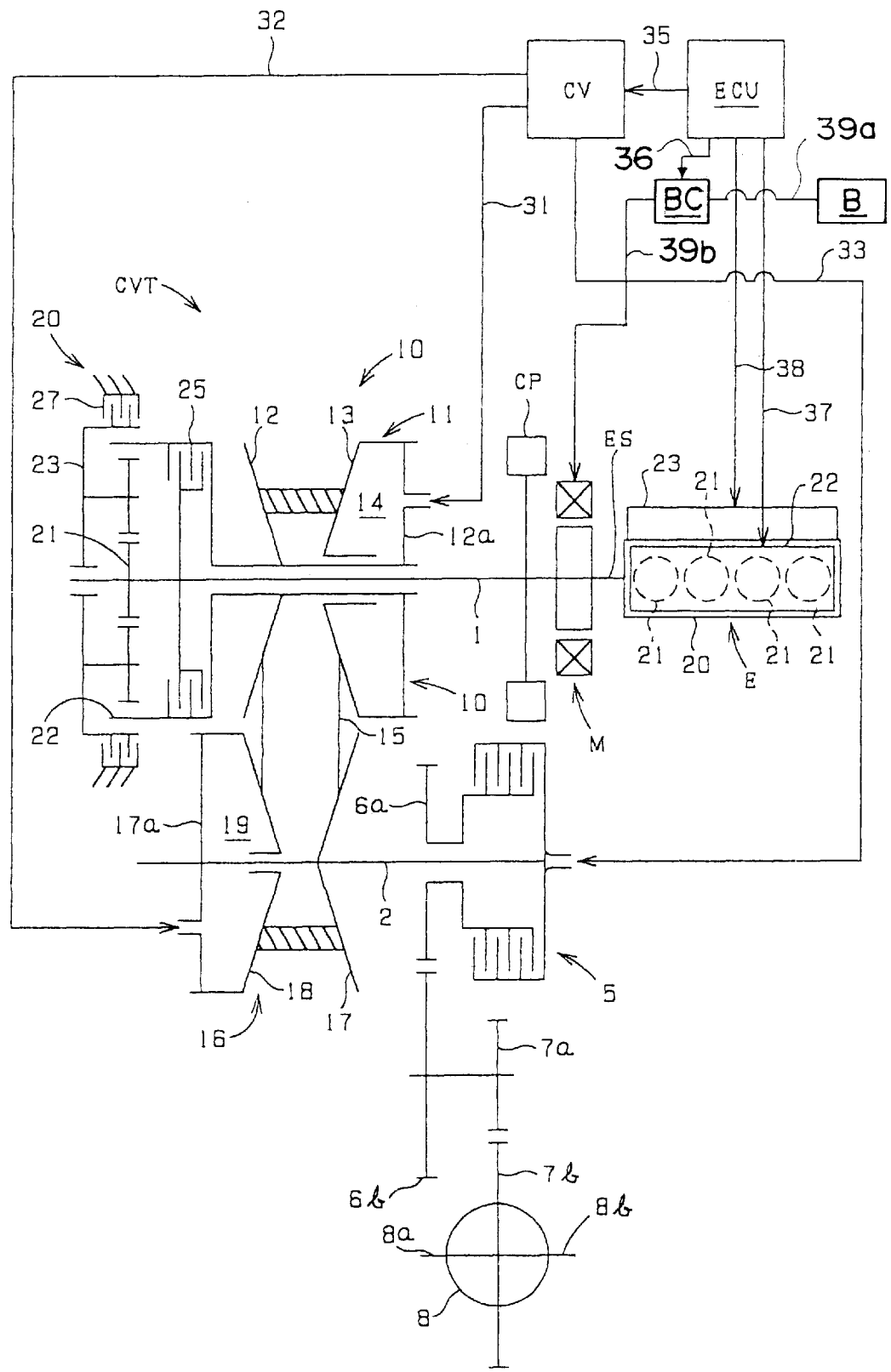
FIG. 2 is a schematic diagram describing the power transmission system of the power transmission.

A preferred embodiment according to the present invention is described in reference to the drawings. FIG. 1 is a sectional view describing the construction of a power transmission used for a vehicle, which power transmission is controlled by a control system according to the present invention. FIG. 2 shows schematically the power transmission system of this power transmission. It is clear from these drawings that this power transmission comprises an engine E, an electrical motor generator M, which is connected to the output shaft Es of the engine E, and a continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21.

The electrical motor generator M can assist the driving force of the engine when the electrical motor generator M is powered through power supply lines 39a and 39b by a battery B incorporated in the vehicle, and it can charge the battery B by generating electricity from the rotational drive received from the wheel side while the vehicle is in a deceleration (energy recovery). Thus, this power transmission has a hybrid-type drive source with a battery controller BC controlling these power supply control and energy recovery control (charging control).

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then through right and left driving axle shafts 8a and 8b to right and left wheels (not shown). In addition, a hydraulic pump P is provided in the transmission housing and is connected to the input shaft 1 through a chain mechanism CM. Therefore, the hydraulic pump P is driven by the input shaft 1, which rotates at the same rotational speed as the output shaft Es of the engine, so that oil is supplied to a control valve CV as described in detail later in this section.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through the control valve CV and through an oil passage 31 into the drive-pulley cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the driven-pulley cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference between these lateral thrusts, so that the groove widths of these pulleys will change to adjust the pitch radii of the respective pulleys for the V belt 15. In this way, the speed change ratio of the transmission is controlled to vary continuously without any step. These lateral thrusts, which are generated in the drive and driven pulleys for the speed change ratio control, are generated from a line pressure that is adjusted by a regulator valve from the pressure of the hydraulic pump P, which is connected to the input shaft 1 through the chain mechanism CM. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged connecting the countershaft to the power transmission gears, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the right and left drive wheels. When the starting clutch 5 is released or disengaged, this power transmission is terminated, so the transmission is in neutral condition. The engagement of the starting clutch 5 is controlled with a clutch-control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch-control pressure supplied from the control valve CV through the oil passage 33 is used for the starting clutch engagement control. For controlling these control pressures, the operation of the control valve CV, which receives oil from the hydraulic pump P, is controlled by means of control signals sent from an electrical control unit ECU.

In a condition where either the forward clutch 25 or the reverse brake 27 is engaged, the transmission of the rotational driving forces of the engine E and the electrical motor generator M to the drive wheels can be controlled by controlling the engaging action of the starting clutch 5. Conversely, in a condition where the starting clutch 5 is engaged, either the forward clutch 25 or the reverse brake 27 can be controlled to transmit the driving forces, achieving the same effect. It should be noted from this reversible point of view that the starting clutch 5, the forward clutch 25 and the reverse brake 27 correspond to the term "frictionally engaging element" defined in the "WHAT IS CLAIMED IS:" section.

In the vehicle incorporating this transmission, the electrical motor generator M assists the driving force of the engine E, so that the engine E can operate in a range which is most fuel efficient. To further improve the fuel efficiency of the vehicle, the electrical motor generator M generates electricity to recover energy exploiting a rotational force received from the drive wheels during the deceleration of the vehicle. Especially while the brake is being operated to restrict the drive wheels during the deceleration, the electrical motor generator M functions to recover a large amount of energy. Simultaneously, it assists the braking force by applying the torque of the energy recovery as a decelerating torque. The operation of the electrical motor generator M for these driving assistance and energy recovery is controlled by the battery controller BC, which receives control signals sent from the electrical control unit ECU through a control line 36. In tandem with the operational control of the electrical motor generator M, the speed ratio change control is performed to achieve an optimal speed change ratio for the transmission, so that the engine E can operate in a most fuel efficient range. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some or all the cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is recovered effectively by the electrical motor generator M.

Figure 3:
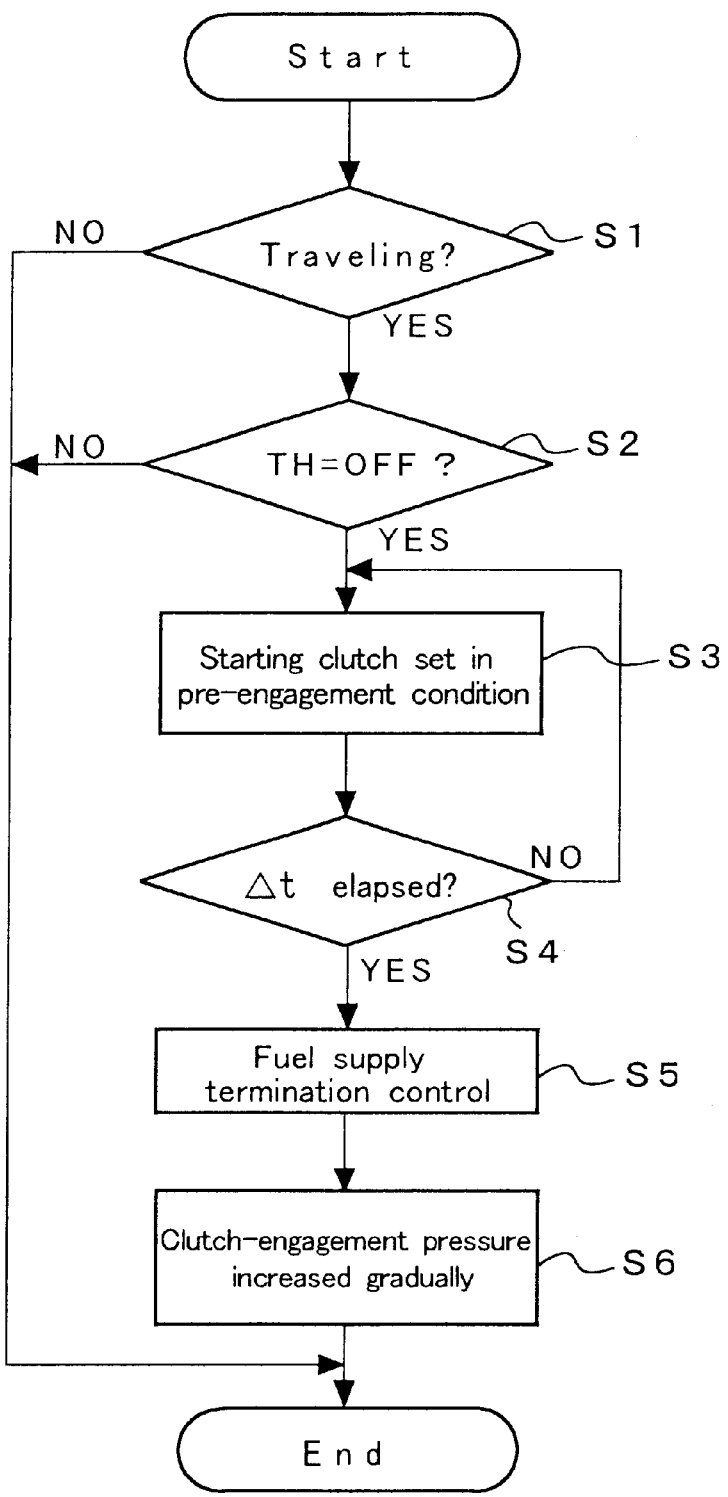
FIG. 3 is a flowchart describing control steps executed by the power-transmission control system according to the present invention.
Figure 4:
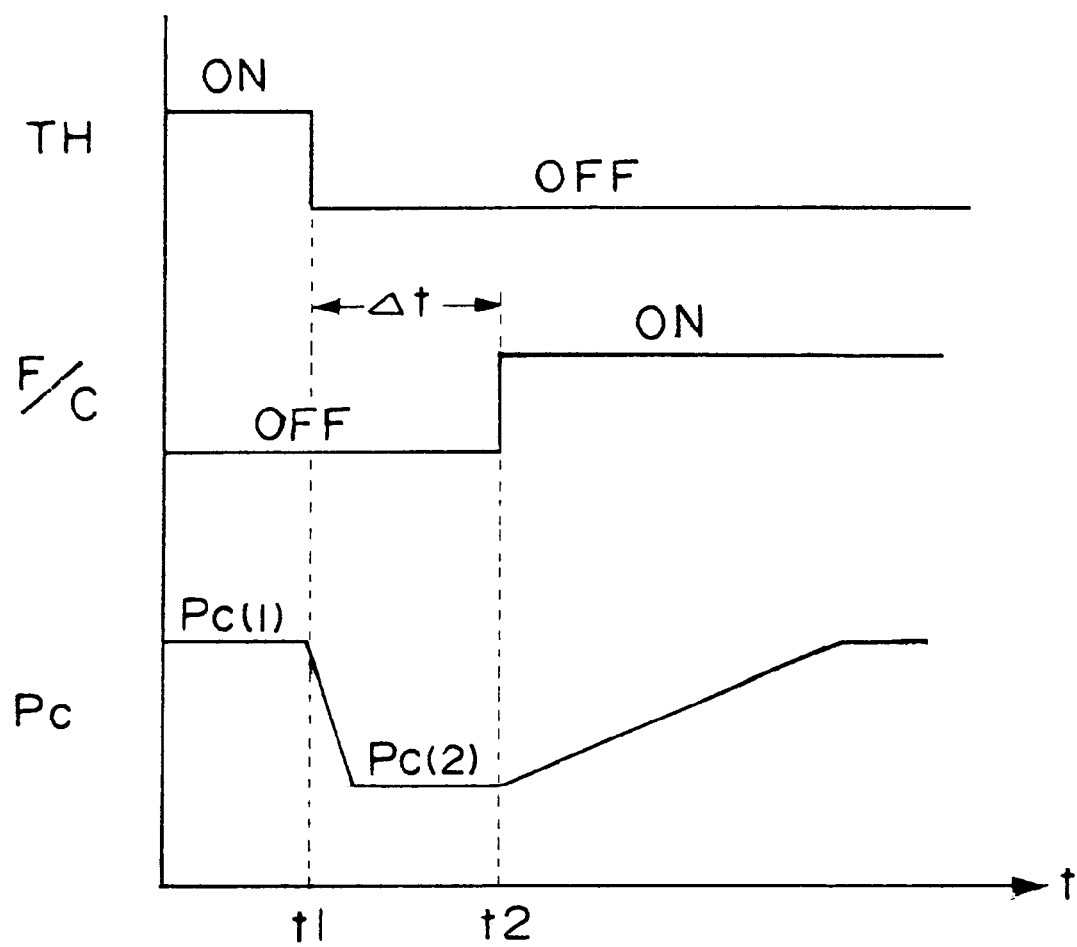
FIG. 4 is a time diagram showing chronological changes observed in various parameters while the control system is in operation.

Now, the operational control of this power transmission is described in reference to the flowchart of FIG. 3 and the time diagram of FIG. 4, which describe a case where while the vehicle is traveling, the accelerator pedal is released to close the engine throttle.

At first, a determination is made whether the vehicle is traveling or not at Step S1, and another determination is made whether the engine throttle is closed (TH=OFF) or not at Step S2. If the result of these determination indicates that the accelerator pedal has been released, resulting in the closing of the engine throttle, then the control flow proceeds to Step S3 and thereafter. Here, as shown in the time diagram of FIG. 4, "TH=OFF" is achieved at time t1 in this example. In other words, the control flow proceeds to Step S3 at time t1, where the pressure actuating the starting clutch 5 is set to a pre-engagement pressure for setting the clutch in a pre-engagement condition, from which the clutch can immediately start an engaging action. As a result, the engagement pressure Pc for the starting clutch 5, which has been set at a pressure Pc(1) necessary for the full engagement of the starting clutch until this point in time, is quickly reduced to the pre-engagement pressure Pc(2) immediately after time t1. The starting clutch 5 receiving the pre-engagement pressure Pc(2) is set in a disengaged condition, but it can start an engaging action immediately if the engagement pressure is increased to, even a little above the pre-engagement pressure.

The starting clutch 5 is set in this pre-engagement condition by the supply of the pre-engagement pressure Pc(2) for a predetermined time period Δt at Step S4. Then, when the predetermined time Δt has elapsed, the fuel supply to the engine is terminated at time t2 at Step S5, and the engagement pressure of the starting clutch 5 is controlled to increase gradually at Step S6.

By this control, when the accelerator pedal is released during a deceleration of the vehicle, at first, the starting clutch 5 is disengaged to prevent an engine brake from acting abruptly onto the drive wheels, eliminating the possibility for a deceleration shock to occur. Then, after the elapse of the predetermined time Δt, when the fuel supply to the engine is terminated, the starting clutch 5 enters into an engaging action gradually, eliminating the possibility of a rapid decrease in the rotational speed of the engine. As a result, after the termination of the fuel supply, this fuel cut-off condition is maintained for improving the fuel economy of the vehicle during the deceleration, and the electrical motor generator M is driven by the rotational drive received from the drive wheels for energy recovery, charging the battery B. Here, the energy recovery rate of the electrical motor generator M is controlled by the battery controller BC.

Figure 5:
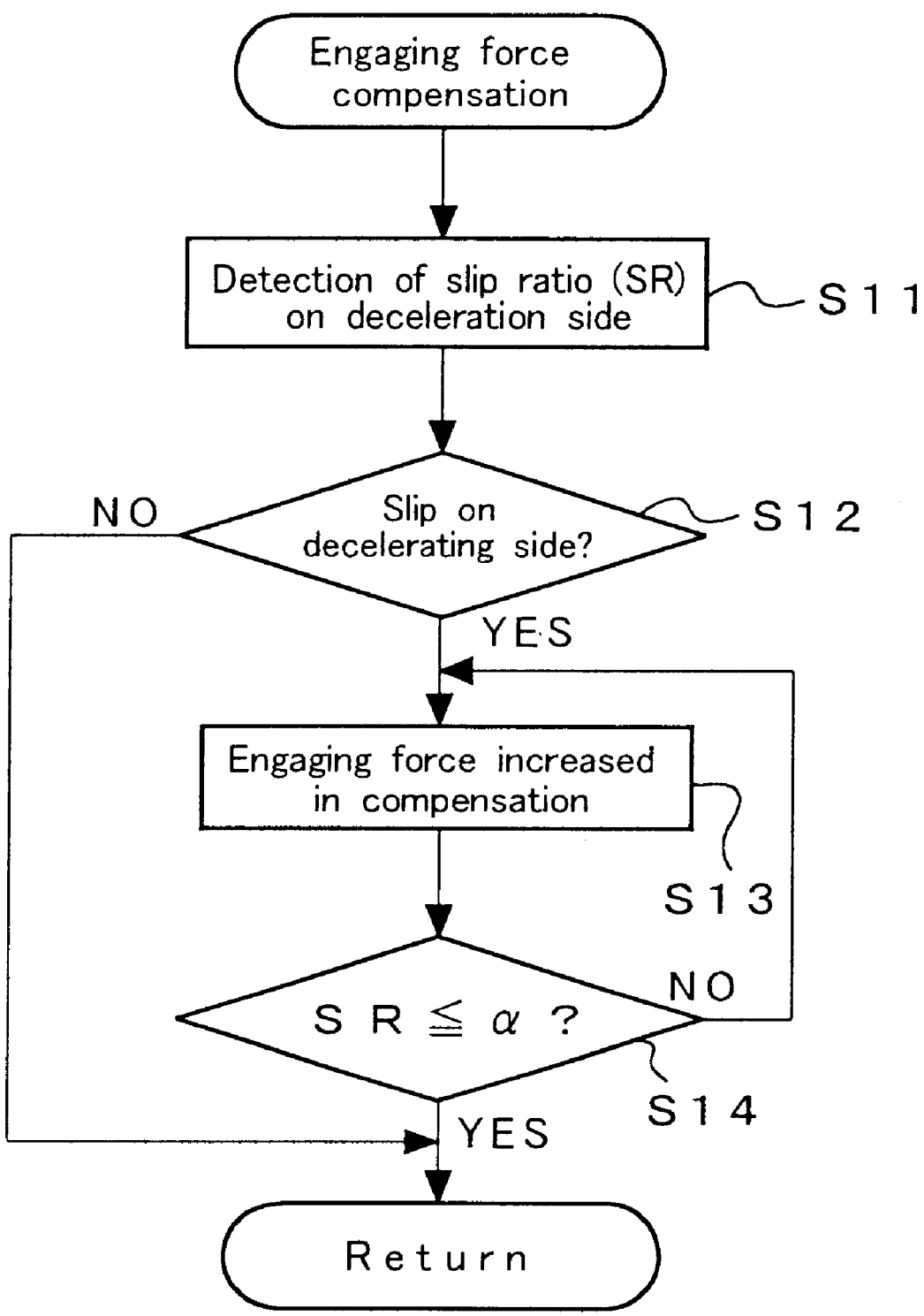
FIG. 5 is a flowchart describing control steps that are executed as a part in the control flow of FIG. 3 for compensation of the engaging force.
Figure 6:
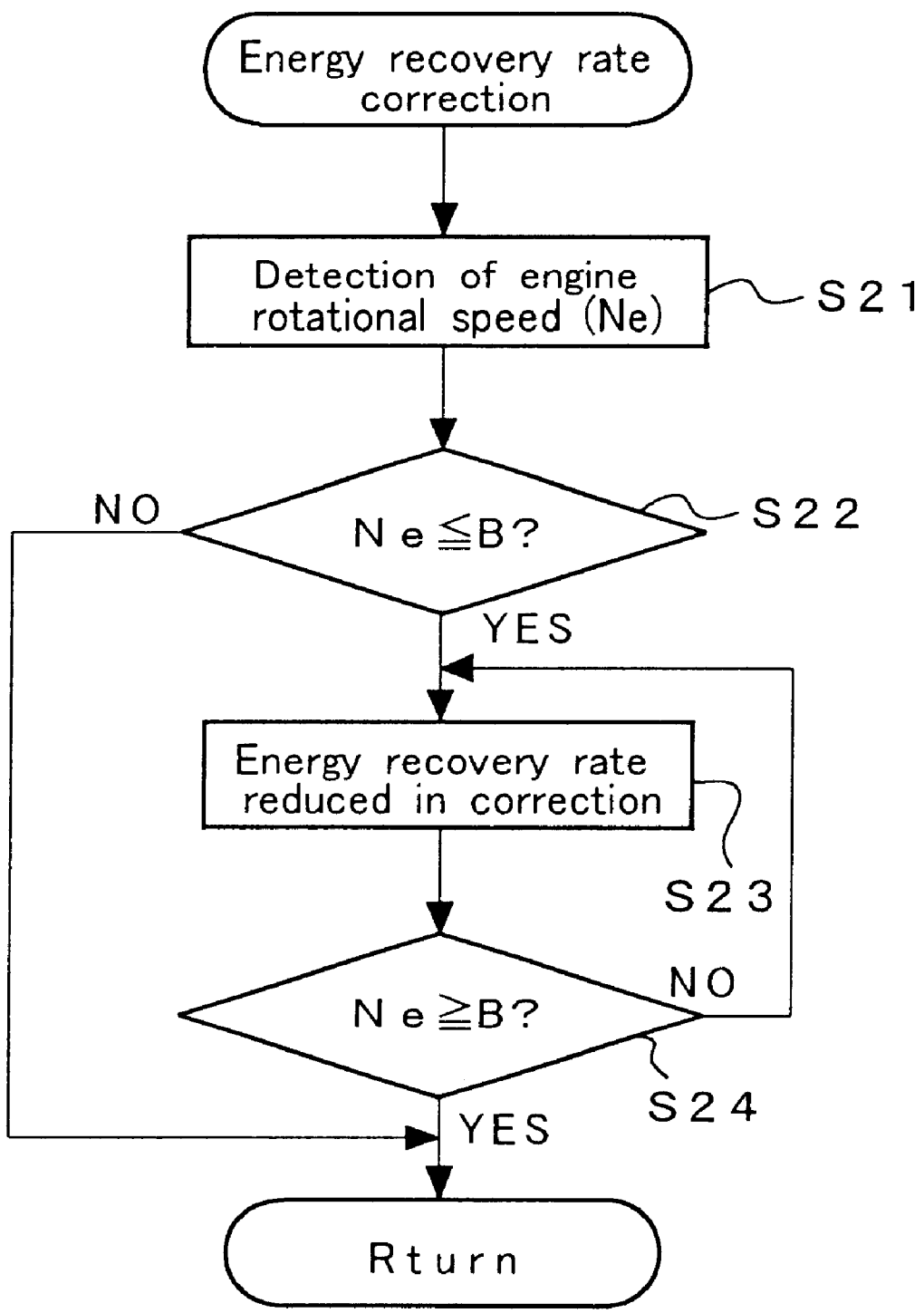
FIG. 6 is a flowchart describing control steps that are executed as a part in the control flow of FIG. 3 for correction of the energy recovery rate.

While the above described control is being executed, if the starting clutch 5 slips to the deceleration side, then a control is executed to compensate the engaging force of the clutch as shown in FIG. 5. If the rotational speed Ne of the engine becomes lower than a predetermined rotational speed, then another control is executed to compensate or correct the energy recovery rate of the electrical motor generator M as shown in FIG. 6. Now, these compensation controls are described.

The engaging force compensation control shown in FIG. 5 is executed by cutting into the control of FIG. 3 being executed. In this control, the slip ratio SR of the decelerating side of the starting clutch 5 is detected at Step S11, and the slip of the decelerating side is monitored at Step S12. When there is a slip on the decelerating side (for example, the slip ratio SR of the decelerating side is greater than a predetermined value), the control flow proceeds from Step S12 to Step S13, where the engaging force of the starting clutch 5 is compensated to increase. As the engaging force is increased in this way, the slip ratio SR decreases. Therefore, a determination is made whether the slip ratio SR has become equal to or smaller than a predetermined value $\alpha$ or not at Step S14. If it is greater, i.e., SR>$\alpha$, then the control flow returns to Step S13, where the engaging force is increased further. In this way, the engaging force of the starting clutch 5 is compensated enough to control the slip ratio SR of the decelerating side smaller or equal to the predetermined value $\alpha$.

This engaging force compensation control prevents the slip ratio SR of the decelerating side from becoming too large, which may otherwise result in a rapid decrease in the rotational speed Ne of the engine. By this control, the rotational speed of the engine is protected against a rapid decrease, so that the termination of the fuel supply to the engine will not be disrupted. Once the fuel supply is terminated, the supply of fuel will not be restarted immaturely in the fuel-supply termination control. This compensation control successfully prevents any impairment to the fuel efficiency of the vehicle. In other words, the fuel-supply termination control is continued in a desired way to improve the fuel efficiency.

The energy recovery rate correction control shown in FIG. 6 is also executed by cutting into the control of FIG. 3 being executed. In this control, the rotational speed Ne of the engine is detected at Step S21, and the rotational speed Ne is monitored at Step S22 whether or not it has become equal to or lower than a predetermined value $\beta$ (for example, 1000 rpm). If it has become equal to or lower than the predetermined value $\beta$, then the control flow proceeds from Step S22 to Step S23, where the energy recovery rate by the electrical motor generator M is reduced for a correction. The recovery torque that is generated when the electrical motor generator M recovers energy acts on the output shaft of the engine as a negative torque in the direction to reduce the rotational speed of the engine. When the energy recovery rate is reduced in correction as described above, then the recovery torque becomes smaller, resulting in a prevention against a further decrease in the rotational speed of the engine.

The rotational speed Ne of the engine is monitored at Step S24 whether or not it has become equal to or higher than the predetermined value $\beta$ by this correction, which reduces the energy recovery rate. If it is lower than the predetermined value $\beta$, then the control flow returns to Step S23, where the energy recovery rate is reduced further. In this way, the rotational speed Ne of the engine is prevented from becoming lower than the predetermined value $\beta$, so the rotational speed Ne never becomes too low to execute the fuel-supply termination control.

The above described embodiment is described in relation to the starting clutch 5 as an example. However, instead of the starting clutch 5, the engagement of the forward clutch 25 or the reverse brake 27 can be controlled in the same way. Furthermore, if the vehicle incorporates a torque converter, then the engagement of the lock-up clutch of the converter may be controlled in a similar manner. Also, in the above embodiment, the present invention is described in relation to the power transmission that incorporates a metal V-belt mechanism 10, but another type of continuously variable transmission or a gear-type automatic transmission is also applicable for a control system according to the present invention.

As described above, when the throttle of the engine is closed to decelerate the vehicle, the control system according to the present invention at first determines whether the throttle is closed or not. If it judges that the throttle is closed, then it releases the frictionally engaging element to a pre-engagement condition. In this condition, there is no possibility for the drive wheels to receive an abrupt engine brake, so the occurrence of deceleration shock is eliminated completely. After the frictionally engaging element is set in the pre-engagement condition, the control system waits for a predetermined time to elapse and then terminates the fuel supply to the engine to improve fuel economy. After the termination of the fuel supply, the control system increases the engaging force of the frictionally engaging element gradually. This action prevents a rapid decrease in the rotational speed of the engine and any shock that may be otherwise caused by an action of a large decelerating force, which is generated in relation to the termination of the fuel supply. According to the present invention, once the fuel supply is terminated, unlike a prior-art control system, there is no chance for the rotational speed of the engine to decrease rapidly and to trigger a restarting of the fuel supply in a short time. Therefore, according to the present invention, the fuel-supply termination control is executed in a desirable way to improve the fuel economy of the vehicle.

If the frictionally engaging element slips to the decelerating side, preferably, the engaging force of the frictionally engaging element is controlled to increase gradually so that the slip ratio is controlled equal to or smaller than a predetermined value. In this way, the rotational speed of the engine is prevented securely from decreasing rapidly. In this condition, unlike a prior-art control system, there is no chance for the rotational speed of the engine to decrease rapidly and to trigger a restarting of the fuel supply in a short time after the termination of the fuel supply. Therefore, the fuel-supply termination control is executed in a desirable way to improve the fuel economy of the vehicle.

Furthermore, the electrical motor generator may be provided at a position on the side of the engine from the frictionally engaging element, such that the energy recovery is performed by the driving force of the drive wheels during a deceleration. In this case, while the energy recovery is going on, if the rotational speed of the engine becomes equal to or lower than a predetermined rotational speed, then preferably, the energy recovery rate is controlled to become lower. By controlling in this way, for example, when the brake is operated to restrict the rotation of the wheels during a deceleration of the vehicle, the energy recovery rate of the electrical motor generator is controlled to increase. Then, if the rotational speed of the engine decreases rapidly, the energy recovery rate is controlled to decrease so that the rotational speed will not become equal to or lower than the predetermined rotational speed. In this way, the control system according to the present invention prevents a rapid decrease in the rotational speed of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-375645 filed on Dec. 10, 2001 which is incorporated herein by reference.

What is claimed is:

1. A vehicular power-transmission control system comprising:
    an engine, which is under a fuel-supply termination control;
    a power-transmission mechanism, which transmits a rotational driving force from said engine to wheels; and
    a frictionally engaging element, which controls a transmission of the rotational driving force in said power-transmission mechanism; wherein:
        said control system, when a throttle of said engine is closed and when the vehicle has started decelerating, executes a vehicle-in-deceleration control to terminate a fuel supply at an elapse of a predetermined time from the starting of the deceleration; and
        in said vehicle-in-deceleration control, when said throttle is detected to have closed, an engaging force of said frictionally engaging element is set to reduce a torque transmitted through said frictionally engaging element, and after the termination of the fuel supply to said engine, said engaging force is gradually increased to bring said frictionally engaging element gradually into engagement.

2. The vehicular power-transmission control system as set forth in claim 1, wherein:
    said power-transmission mechanism comprises a belt-type continuously variable transmission mechanism; and
    said frictionally engaging element comprises a hydraulically actuated clutch.

3. The vehicular power-transmission control system as set forth in claim 1, wherein:
    said engine comprises a plurality of cylinder bores with suction and exhaust valves and an fuel injection and ignition controller, whose operation is controllable; and
    said engine is capable of being operated in a partial cylinder operation mode, in which said suction and exhaust valves of some or all of said cylinder bores are set closed and controlled not to allow any fuel injection and ignition.

4. The vehicular power-transmission control system as set forth in claim 1, wherein:
    in said vehicle-in-deceleration control, when said throttle is detected to have closed, the engaging force of said frictionally engaging element is reduced to set said frictionally engaging element into a pre-engagement condition.

5. The vehicular power-transmission control system as set forth in claim 1, wherein:
    in said vehicle-in-deceleration control, when said throttle is detected to have closed, the engaging force of said frictionally engaging element is set to reduce the torque transmitted through said frictionally engaging element; and
    thereafter, when a predetermined time elapses, the fuel supply to said engine is terminated, and simultaneously, said engaging force is gradually increased to bring said frictionally engaging element gradually into engagement.

6. The vehicular power-transmission control system as set forth in claim 1, wherein:
    in said vehicle-in-deceleration control, if said frictionally engaging element slips to a decelerating side, then the engaging force of said frictionally engaging element is increased gradually and simultaneously controlled to hold a slip ratio of said frictionally engaging element within a range below a predetermined value.

7. The vehicular power-transmission control system as set forth in claim 1, further comprising an electrical motor generator, which is positioned closer to said engine rather than to said frictionally engaging element, said electrical motor generator being capable of driving said wheels through said power-transmission mechanism and of recovering energy by receiving a driving force from said wheels through said power-transmission mechanism; wherein:
    in said vehicle-in-deceleration control, said electrical motor generator is controlled in correspondence to an engagement condition of said frictionally engaging element, to recover energy from a driving force received from said wheels through said power-transmission mechanism; and
    while said electrical motor generator is being controlled to recover energy in this way, if the rotational speed of said engine becomes equal to or lower than a predetermined rotational speed, then a rate of said energy recovery is controlled to decrease.

* * * * *